United States Patent
Graham et al.

(10) Patent No.: US 10,572,757 B2
(45) Date of Patent: Feb. 25, 2020

(54) USER INTERFACE FOR OBJECT DETECTION AND LABELING

(71) Applicants: Jamey Graham, San Jose, CA (US); Sri Kaushik Pavani, Chennai (IN)

(72) Inventors: Jamey Graham, San Jose, CA (US); Sri Kaushik Pavani, Chennai (IN)

(73) Assignee: Ricoh Co., Ltd., Tokyo (JP)

( * ) Notice: Subject to any disclaimer, the term of this patent is extended or adjusted under 35 U.S.C. 154(b) by 63 days.

(21) Appl. No.: 15/916,980

(22) Filed: Mar. 9, 2018

(65) Prior Publication Data
US 2019/0279017 A1    Sep. 12, 2019

(51) Int. Cl.
| | | |
|---|---|---|
| G06K 9/00 | (2006.01) | |
| G06K 9/32 | (2006.01) | |
| G06N 20/00 | (2019.01) | |
| G06K 9/34 | (2006.01) | |
| G06K 9/62 | (2006.01) | |
| G07G 1/00 | (2006.01) | |
| G06K 9/22 | (2006.01) | |
| G06Q 20/20 | (2012.01) | |

(52) U.S. Cl.
CPC ....... *G06K 9/3241* (2013.01); *G06K 9/00671* (2013.01); *G06K 9/22* (2013.01); *G06K 9/34* (2013.01); *G06K 9/6253* (2013.01); *G06K 9/6255* (2013.01); *G06K 9/6256* (2013.01); *G06K 9/6267* (2013.01); *G06N 20/00* (2019.01); *G06Q 20/208* (2013.01); *G07G 1/0063* (2013.01); *G06K 2209/17* (2013.01)

(58) Field of Classification Search
CPC ...... G06K 9/3241; G06K 9/34; G06K 9/6267; G06K 9/00671; G06K 9/6255; G06K 9/6256; G06K 9/22; G06K 9/6253; G06K 2209/17; G06N 20/00; G06Q 20/208; G07G 1/0063
See application file for complete search history.

(56) References Cited

U.S. PATENT DOCUMENTS

| | | | | |
|---|---|---|---|---|
| 2006/0004914 A1* | 1/2006 | Kelly | ................... | G06Q 30/00 709/219 |
| 2008/0100704 A1* | 5/2008 | Venetianer | ......... | G06K 9/00771 348/143 |

(Continued)

OTHER PUBLICATIONS

Demkiv, "Labeling Tool—Faster Data Acquisition with a Preclassifier and Integrated Classifier Training," Mar. 5, 2017, retrieved from https://www.youtube.com/watch?v=HMGxr0tsk7Q on Jul. 22, 2019, 1 pg.

*Primary Examiner* — Yon J Couso
(74) *Attorney, Agent, or Firm* — Patent Law Works LLP

(57) ABSTRACT

A system and method that gathers and labels images for use by a machine learning algorithm for image classification is disclosed. The method includes acquiring a preview image including a portion of a scene, generating a user interface including the preview image, performing object detection on the preview image to detect a set of items, adding, to the first preview image, a set of regions of interest based on the object detection, each region of interest highlighting a location of a corresponding item in the set of items, receiving an image corresponding to the preview image, determining an object identifier associated with an item, and labeling the item in the image using the object identifier and a region of interest corresponding to the item.

20 Claims, 12 Drawing Sheets

(56) References Cited

U.S. PATENT DOCUMENTS

| | | | |
|---|---|---|---|
| 2014/0259056 A1* | 9/2014 | Grusd | H04N 21/8583 725/34 |
| 2015/0178320 A1* | 6/2015 | Gao | G06F 17/2765 707/708 |
| 2016/0065861 A1* | 3/2016 | Steinberg | G06K 9/00228 348/239 |
| 2016/0328660 A1 | 11/2016 | Huang | |
| 2017/0178335 A1 | 6/2017 | Pavani et al. | |

* cited by examiner

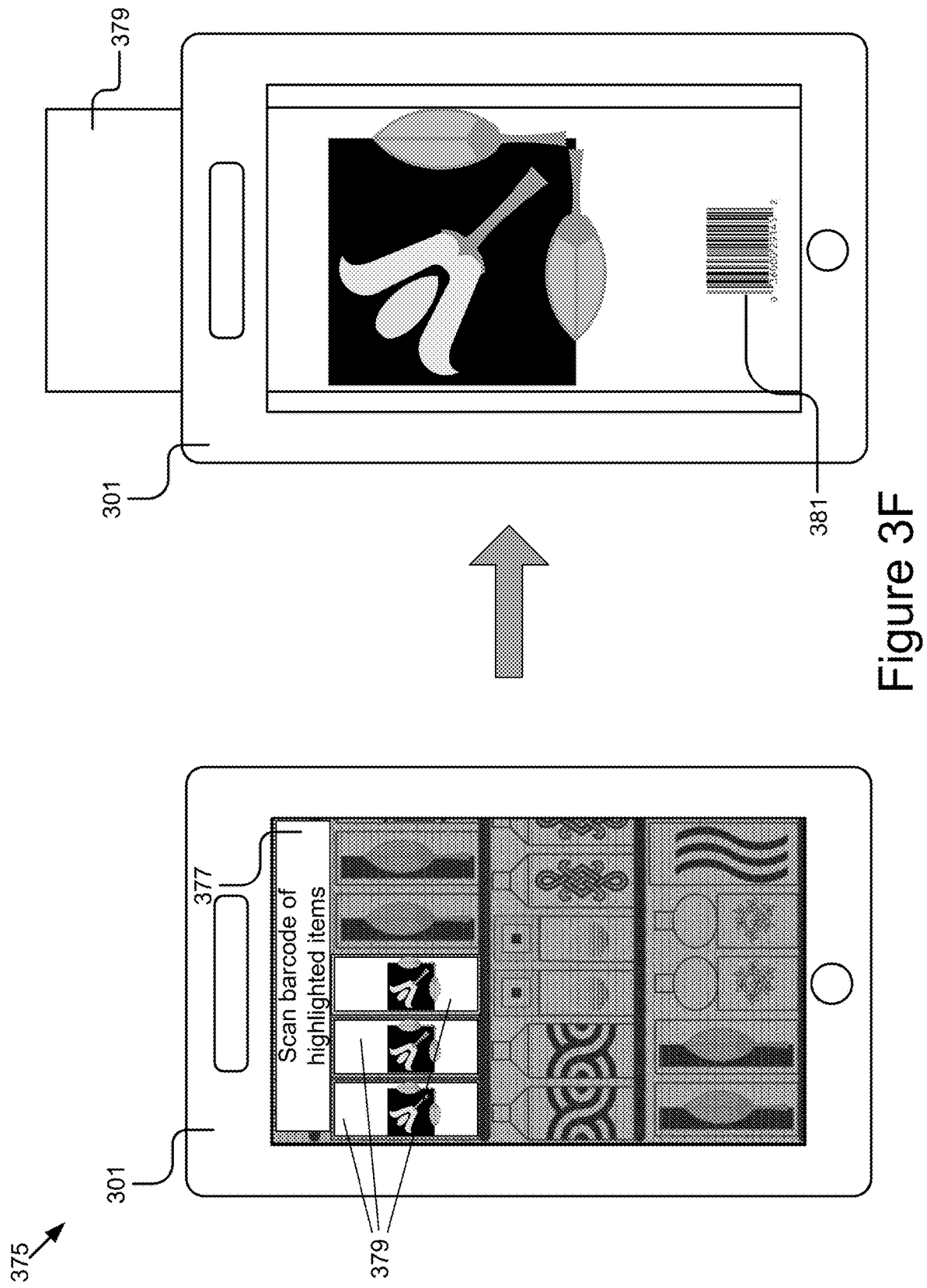

US 10,572,757 B2

USER INTERFACE FOR OBJECT DETECTION AND LABELING

BACKGROUND

Field of the Invention

The specification generally relates to gathering and labeling images for use by a machine learning algorithm for image classification. In particular, the specification relates to a system and method for performing object detection on an image of a scene and labeling detected items in the scene for use by the machine learning algorithm.

Description of the Background Art

Typically, computer vision or image classification systems depend on having access to a vast number of labeled images. It is also important that the objects in the labeled images are captured in a realistic setting (e.g., a setting where the object will be found) since studio captured images of an object typically do not make good candidates for use in image recognition. However, having access to high-quality labeled images is not simple or cheap. One important aspect of computer vision is creating a database of images with which to train in image classifier. Even if the database includes information identifying the object, the image recognition does not always succeed when the database has limited images of the object to train the classifier. Hence, in the case of recognition of objects (e.g., products on a store shelf), a complete and diverse database is important.

Previous attempts at building product databases have deficiencies. For example, one method is to outsource the task and rely on untrained personnel to perform the labeling function. Unfortunately, this approach is expensive and time consuming. It may lead to losing control over the quality and consistency of resulting labeled images. As a result, image recognition can be negatively affected.

SUMMARY

The techniques introduced herein overcome the deficiencies and limitations of the prior art, at least in part, with a system and method for gathering and labeling images for use by a machine learning algorithm for image classification. In one embodiment, the system includes one or more processors and a memory storing instructions which when executed cause the one or more processors to acquire a preview image including a portion of a scene, generate a user interface including the preview image, perform object detection on the preview image to detect a set of items, add, to the preview image, a set of regions of interest based on the object detection, each region of interest in the set highlighting a location of a corresponding item in the set of items, receive an image corresponding to the preview image, determine an object identifier associated with an item in the image, and label the item in the image using the object identifier and a region of interest corresponding to the item.

Other aspects include corresponding methods, systems, apparatuses, and computer program products for these and other innovative aspects.

The features and advantages described herein are not all-inclusive and many additional features and advantages will be apparent in view of the figures and description. Moreover, it should be noted that the language used in the specification has been principally selected for readability and instructional purposes and not to limit the scope of the techniques described.

BRIEF DESCRIPTION OF THE DRAWINGS

The techniques introduced herein are illustrated by way of example, and not by way of limitation in the figures of the accompanying drawings in which like reference numerals are used to refer to similar elements.

FIG. 3A-3G are graphical representations of one embodiment of a process for gathering and labeling images for use by a machine learning algorithm for image classification.

DETAILED DESCRIPTION

Figure 1:
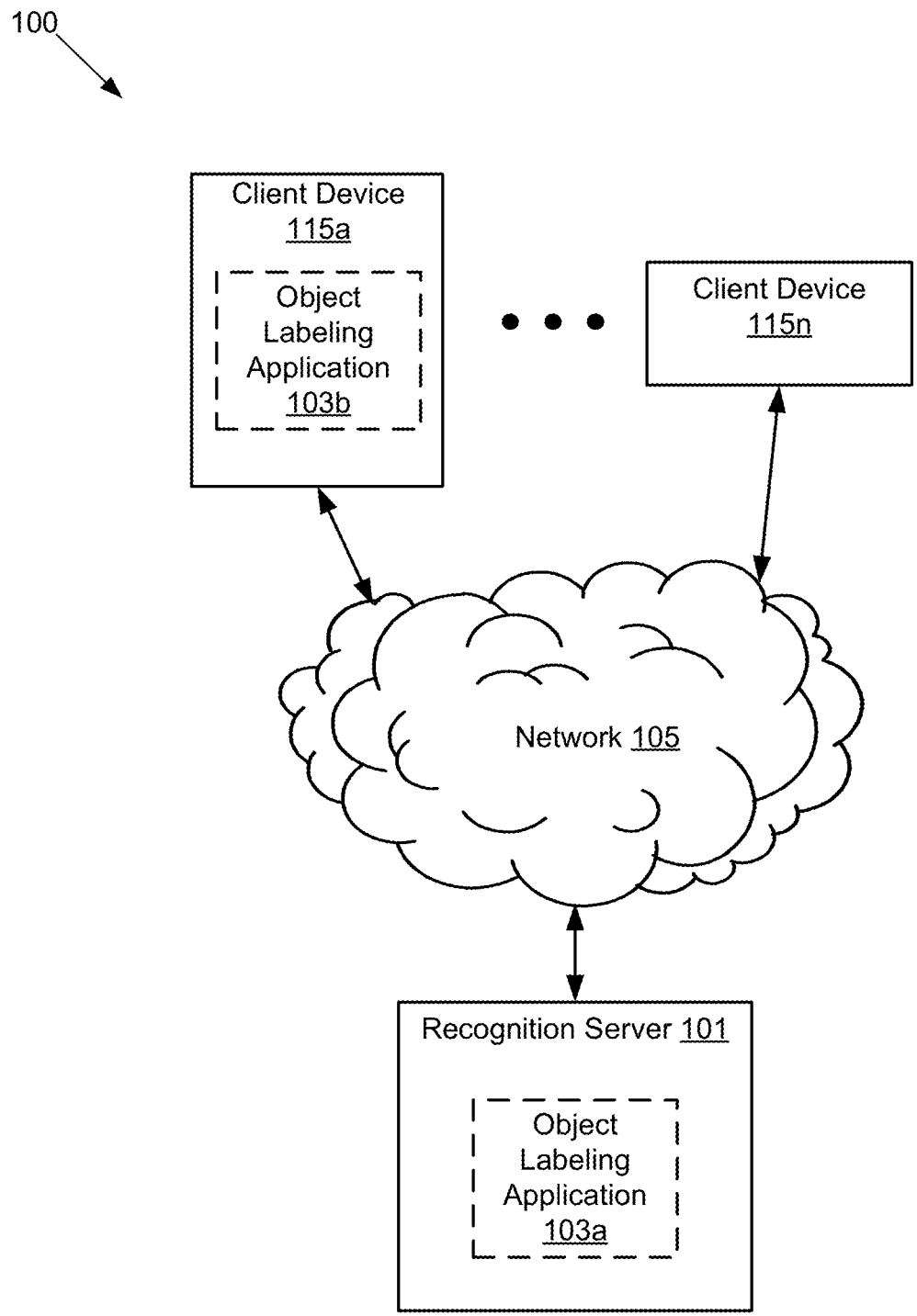
FIG. 1 is a high-level block diagram illustrating one embodiment of a system for gathering and labeling images for use by a machine learning algorithm for image classification.

FIG. 1 is a high-level block diagram illustrating one embodiment of a system 100 for gathering and labeling images for use by a machine learning algorithm for image classification. The illustrated system 100 may have one or more client devices 115a . . . 115n, which can be accessed by users, and a recognition server 101. In FIG. 1 and the remaining figures, a letter after a reference number, e.g., "115a," represents a reference to the element having that particular reference number. A reference number in the text without a following letter, e.g., "115," represents a general reference to instances of the element bearing that reference number. In the illustrated embodiment, these entities of the system 100 are communicatively coupled via a network 105.

The network 105 can be a conventional type, wired or wireless, and may have numerous different configurations including a star configuration, token ring configuration, or other configurations. Furthermore, the network 105 may include a local area network (LAN), a wide area network (WAN) (e.g., the Internet), and/or other interconnected data paths across which multiple devices may communicate. In some embodiments, the network 105 may be a peer-to-peer network. The network 105 may also be coupled to or include portions of a telecommunications network for sending data in a variety of different communication protocols. In some embodiments, the network 105 may include Bluetooth communication networks or a cellular communications network for sending and receiving data including via short messaging service (SMS), multimedia messaging service (MMS), hypertext transfer protocol (HTTP), direct data connection, WAP, email, etc. Although FIG. 1 illustrates one network 105 coupled to the client devices 115 and the recognition server 101, in practice one or more networks 105 can be connected to these entities.

In some embodiments, the system 100 includes a recognition server 101 coupled to the network 105. The recognition server 101 may be, or may be implemented by, a computing device including a processor, a memory, applications, a database, and network communication capabilities. In the example of FIG. 1, the components of the recognition server 101 are configured to implement an object labeling application 103a described in more detail below. In one embodiment, the recognition server 101 provides services to a consumer packaged goods firm, or the like, for detecting and identifying items on shelves, racks, or displays. While the examples herein describe recognition of products in an image of shelves, such as a retail display, it should be understood that the image may include any arrangement of organized objects or items. For example, the image may be of a warehouse, stockroom, store room, cabinet, etc. Similarly, the objects, in addition to retail products, may be tools, parts used in manufacturing, construction or maintenance, medicines, first aid supplies, emergency or safety equipment, etc.

In some embodiments, the recognition server 101 sends and receives data to and from other entities of the system 100 via the network 105. For example, the recognition server 101 sends and receives data including images to and from the client device 115. The images received by the recognition server 101 can include an image captured by the client device 115, an image copied from a web site or an email, or an image from any other source. Although only a single recognition server 101 is shown in FIG. 1, it should be understood that there may be any number of recognition servers 101 or a server cluster. The recognition server 101 may include data storage.

The client device 115 may be a computing device that includes a memory, a processor and a camera, for example a laptop computer, a desktop computer, a tablet computer, a mobile telephone, a smartphone, a personal digital assistant (PDA), a mobile email device, a webcam, a user wearable computing device or any other electronic device capable of accessing a network 105. The client device 115 provides general graphics and multimedia processing for any type of application. For example, the client device 115 may include a graphics processor unit (GPU) for handling graphics and multimedia processing. The client device 115 includes a display for viewing information provided by the recognition server 101. While FIG. 1 illustrates two client devices 115a and 115n, the disclosure applies to a system architecture having one or more client devices 115.

The client device 115 is adapted to send and receive data to and from the recognition server 101. For example, the client device 115 sends a captured image to the recognition server 101 and the recognition server 101 provides data including regions of interest relating to one or more objects detected in the captured image to the client device 115.

The object labeling application 103 may include software and/or logic to provide the functionality for performing object detection and labeling of detected items in an image. In some embodiments, the object labeling application 103 can be implemented using programmable or specialized hardware, such as a field-programmable gate array (FPGA) or an application-specific integrated circuit (ASIC). In some embodiments, the object labeling application 103 can be implemented using a combination of hardware and software. In other embodiments, the object labeling application 103 may be stored and executed on a combination of the client devices 115 and the recognition server 101, or by any one of the client devices 115 or recognition server 101.

In some embodiments, the object labeling application 103b may be a thin-client application with some functionality executed on the client device 115 and additional functionality executed on the recognition server 101 by the object labeling application 103a. For example, the object labeling application 103b on the client device 115 could include software and/or logic for capturing an image, transmitting the image to the recognition server 101, and displaying results of detected items. In another example, the object labeling application 103a on the recognition server 101 could include software and/or logic for receiving a series of images, stitching the images into a larger composite image based on each received image having sufficient overlap with a previously received image in the series, and generating object detection results for the composite image. In yet another example, the object labeling application 103a on the recognition server 101 could include software and/or logic for cropping images of detected items and labeling the cropped images from an image of a scene. The object labeling application 103a or 103b may include further functionality described herein, such as, processing the image and performing feature identification. The operation of the object labeling application 103 and the functions listed above are described below in more detail below with reference to FIGS. 2-5.

Figure 2:
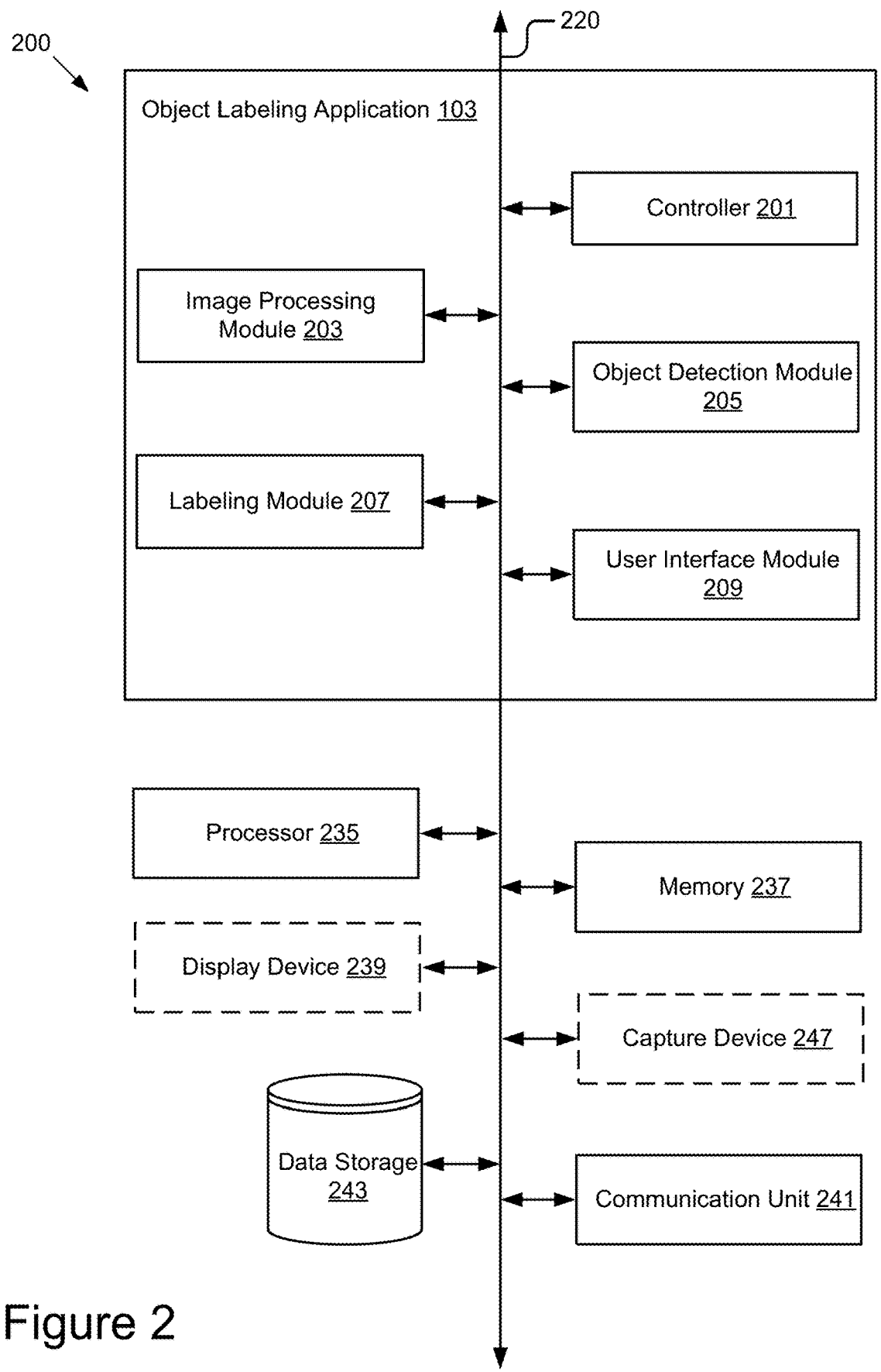
FIG. 2 is a block diagram illustrating one embodiment of a computing device including an object labeling application.

FIG. 2 is a block diagram illustrating one embodiment of a computing device 200 including an object labeling application 103. The computing device 200 may also include a processor 235, a memory 237, an optional display device 239, a communication unit 241, data storage 243, and an optional capture device 247 according to some examples. The components of the computing device 200 are communicatively coupled by a bus 220. The bus 220 may represent one or more buses including an industry standard architecture (ISA) bus, a peripheral component interconnect (PCI) bus, a universal serial bus (USB), or some other bus known in the art to provide similar functionality. In some embodiments, the computing device 200 may be the client device 115, the recognition server 101, or a combination of the client device 115 and the recognition server 101. In such embodiments where the computing device 200 is the client device 115 or the recognition server 101, it should be understood that the client device 115, and the recognition server 101 may include other components described above but not shown in FIG. 2.

The processor 235 may execute software instructions by performing various input/output, logical, and/or mathematical operations. The processor 235 may have various computing architectures to process data signals including, for example, a complex instruction set computer (CISC) architecture, a reduced instruction set computer (RISC) architecture, and/or an architecture implementing a combination of instruction sets. The processor 235 may be physical and/or virtual and may include a single processing unit or a plurality of processing units and/or cores. In some implementations, the processor 235 may be capable of generating and providing electronic display signals to a display device, supporting the display of images, capturing and transmitting images, performing complex tasks including various types of feature extraction and sampling, etc. In some implementations, the processor 235 may be coupled to the memory 237 via the bus 220 to access data and instructions therefrom and store data therein. The bus 220 may couple the processor 235 to the other components of the computing device 200 including, for example, the memory 237, the communication unit 241, the object labeling application 103, and the data storage 243. It will be apparent to one skilled in the art that other processors, operating systems, sensors, displays, and physical configurations are possible.

The memory 237 may store and provide access to data for the other components of the computing device 200. The memory 237 may be included in a single computing device or distributed among a plurality of computing devices as discussed elsewhere herein. In some implementations, the memory 237 may store instructions and/or data that may be executed by the processor 235. The instructions and/or data may include code for performing the techniques described herein. For example, in one embodiment, the memory 237 may store the object labeling application 103. The memory 237 is also capable of storing other instructions and data, including, for example, an operating system, hardware drivers, other software applications, databases, etc. The memory 237 may be coupled to the bus 220 for communication with the processor 235 and the other components of the computing device 200.

The memory 237 may include one or more non-transitory computer-usable (e.g., readable, writeable) device, a static random access memory (SRAM) device, a dynamic random access memory (DRAM) device, an embedded memory device, a discrete memory device (e.g., a PROM, FPROM, ROM), a hard disk drive, an optical disk drive (CD, DVD, Blu-Ray™, etc.) mediums, which can be any tangible apparatus or device that can contain, store, communicate, or transport instructions, data, computer programs, software, code, routines, etc., for processing by or in connection with the processor 235. In some implementations, the memory 237 may include one or more of volatile memory and non-volatile memory. It should be understood that the memory 237 may be a single device or may include multiple types of devices and configurations.

The display device 239 is a liquid crystal display (LCD), light emitting diode (LED) or any other similarly equipped display device, screen or monitor. The display device 239 represents any device equipped to display user interfaces, electronic images, and data as described herein. In different embodiments, the display is binary (only two different values for pixels), monochrome (multiple shades of one color), or allows multiple colors and shades. The display device 239 is coupled to the bus 220 for communication with the processor 235 and the other components of the computing device 200. It should be noted that the display device 239 is shown in FIG. 2 with dashed lines to indicate it is optional. For example, where the computing device 200 is the recognition server 101, the display device 239 may not be part of the system, where the computing device 200 is the client device 115, the display device 239 is included and is used to display user interfaces for performing the techniques described herein.

The communication unit 241 is hardware for receiving and transmitting data by linking the processor 235 to the network 105 and other processing systems. The communication unit 241 receives data such as requests from the client device 115 and transmits the requests to the controller 201, for example a request to process an image. The communication unit 241 also transmits information including image processing results to the client device 115 for display, for example, in response to processing the image. The communication unit 241 is coupled to the bus 220. In one embodiment, the communication unit 241 may include a port for direct physical connection to the client device 115 or to another communication channel. For example, the communication unit 241 may include an RJ45 port or similar port for wired communication with the client device 115. In another embodiment, the communication unit 241 may include a wireless transceiver (not shown) for exchanging data with the client device 115 or any other communication channel using one or more wireless communication methods, such as IEEE 802.11, IEEE 802.16, Bluetooth® or another suitable wireless communication method.

In yet another embodiment, the communication unit 241 may include a cellular communications transceiver for sending and receiving data over a cellular communications network such as via short messaging service (SMS), multimedia messaging service (MMS), hypertext transfer protocol (HTTP), direct data connection, WAP, e-mail or another suitable type of electronic communication. In still another embodiment, the communication unit 241 may include a wired port and a wireless transceiver. The communication unit 241 also provides other conventional connections to the network 105 for distribution of files and/or media objects using standard network protocols such as TCP/IP, HTTP, HTTPS, and SMTP as will be understood to those skilled in the art.

The data storage 243 is a non-transitory memory that stores data for providing the functionality described herein. The data storage 243 may be a dynamic random access memory (DRAM) device, a static random access memory (SRAM) device, flash memory, or some other memory devices. In some embodiments, the data storage 243 also may include a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

In the illustrated embodiment, the data storage 243 is communicatively coupled to the bus 220. The data storage 243 stores data for analyzing a received image and results of the analysis and other functionality as described herein. For example, the data storage 243 may store a database of labeled images associated with a plurality of stock keeping units for training a machine learning algorithm for image classification and recognition purposes. A stock keeping unit (SKU) is a distinct item, such as a product offered for sale. The database includes attributes that make the item distinguishable as a distinct product from all other items. For example, the attributes may include a unique identifier (e.g., Universal Product Code (UPC)), product name, physical dimensions (e.g., width, height, depth, etc.), size (e.g., liters, gallons, ounces, pounds, kilograms, fluid ounces, etc.), facing side (e.g., front, back, side, top, bottom, etc.), description, brand manufacturer, color, packaging version, material, model number, price, discount, base image, etc. The term stock keeping unit or SKU may also refer to a unique identifier that refers to the particular product or service in the inventory. In some embodiments, the data storage 243 stores a received image, the set of features determined for the received image, and a realogram associated with the received image. The data stored in the data storage 243 is described below in more detail.

The capture device 247 may be operable to capture an image or data digitally of an object of interest. For example, the capture device 247 may be a high definition (HD) camera, a regular 2D camera, a multi-spectral camera, a structured light 3D camera, a time-of-flight 3D camera, a stereo camera, a standard smartphone camera, a wearable computing device, a barcode reader, etc. The capture device 247 is coupled to the bus to provide the images and other processed metadata to the processor 235, the memory 237, or the data storage 243. It should be noted that the capture device 247 is shown in FIG. 2 with dashed lines to indicate it is optional. For example, where the computing device 200 is the recognition server 101, the capture device 247 may not be part of the system, where the computing device 200 is the client device 115, the capture device 247 is included and is used to provide images and other metadata information described below.

In some embodiments, the object labeling application 103 may include a controller 201, an image processing module 203, an object detection module 205, a labeling module 207, and a user interface module 209. The components of the object labeling application 103 are communicatively coupled via the bus 220. The components of the object labeling application 103 may each include software and/or logic to provide their respective functionality. In some embodiments, the components of the object labeling application 103 can each be implemented using programmable or specialized hardware including a field-programmable gate array (FPGA) or an application-specific integrated circuit (ASIC). In some embodiments, the components of the object labeling application 103 can each be implemented using a combination of hardware and software executable by the processor 235. In some embodiments, the components of the object labeling application 103 may each be stored in the memory 237 and be accessible and executable by the processor 235. In some embodiments, the components of the object labeling application 103 may each be adapted for cooperation and communication with the processor 235, the memory 237, and other components of the object labeling application 103 via the bus 220.

The controller 201 may include software and/or logic to control the operation of the other components of the object labeling application 103. The controller 201 controls the other components of the object labeling application 103 to perform the methods described below with reference to FIGS. 4-5. The controller 201 may also include software and/or logic to provide the functionality for handling communications between the object labeling application 103 and other components of the computing device 200 as well as between the components of the object labeling application 103.

In some embodiments, the controller 201 sends and receives data, via the communication unit 241, to and from one or more of the client device 115 and the recognition server 101. For example, the controller 201 receives, via the communication unit 241, an image from a client device 115 operated by a user and sends the image to the image processing module 203. In another example, the controller 201 receives data for providing a graphical user interface to a user from the user interface module 209 and sends the data to a client device 115, causing the client device 115 to present the user interface to the user.

In some embodiments, the controller 201 receives data from other components of the object labeling application 103 and stores the data in the data storage 243. For example, the controller 201 receives data including features identified for an image from the image processing module 203 and stores the data in the data storage 243. In other embodiments, the controller 201 retrieves data from the data storage 243 and sends the data to other components of the object labeling application 103. For example, the controller 201 retrieves data including an object identifier of an item or product from the data storage 243 and sends the retrieved data to the labeling module 207.

In some embodiments, the communications between the object labeling application 103 and other components of the computing device 200 as well as between the components of the object labeling application 103 can occur autonomously and independent of the controller 201.

The image processing module 203 may include software and/or logic to provide the functionality for acquiring and processing one or more images of a scene from the client device 115. For example, the image processing module 203 receives one or more images of a set of shelves in a retail scene from the client device 115. In some embodiments, image processing module 203 continuously acquires preview images of a scene sampled by the capture device 247. The image processing module 203 instructs the user interface module 209 to generate a user interface to display a live preview image of the scene on a display of the client device 115. The image processing module 203 sends the preview images to the object detection module 205. In some embodiments, the image processing module 203 receives a still image of the scene captured by the capture device 247 and sends the still image to the object detection module 205.

The images may include multiple items of interest with different scales/sizes and present at different locations. For example, the image can be an image of packaged products on a set of shelves (e.g., coffee packages, breakfast cereal boxes, soda bottles, etc.) which reflects a real-time placement and movement of packaged products on the shelves inside a retail store. A packaged product of a brand manufacturer may include textual and pictorial information printed on its surface that distinguishes it from packaged products belonging to one or more other brand manufacturers. The packaged products may also sit in an orientation on the shelf exposed to the user looking at the shelf. For example, a box-like packaged product might be oriented with the front, the back, the side, the top, or the bottom of the product exposed to the user looking at the shelf. It should be understood that there can be other products displayed on shelves without having a package.

In some embodiments, the image processing module 203 receives instructions from the object detection module 205 to cooperate with the capture device 247 and capture a still image when it is determined that object detection has saturated in the preview image of the scene. The image processing module 203 determines whether successful processing is likely on the received image. The image processing module 203 instructs the user interface module 209 to generate graphical data including instructions for the user to retake the image if a portion of the image captured by the client device 115 has limited information for complete recognition (e.g., a feature rich portion is cut off), object detection (e.g., the image is too blurry), the image has an illumination artifact (e.g., excessive reflection), etc.

In some embodiments, the image processing module 203 receives a selection of a pattern of image capture for receiving images of a scene from the client device 115. The image processing module 203 sends instructions to the user interface module 209 to generate graphical data including visually distinct indicators for guiding a directional movement of the client device 115 based on the pattern of image capture. For example, the user interface on the client device 115 may visually display a directional arrow instructing the user to make a vertical or lateral movement to preview or receive next images of a scene.

The image processing module 203 cooperates with the capture device 247 to receive a sequence of individual and overlapping images of the scene based on a plurality of vertical and lateral movements of the client device 115. For example, the images may be a sequence of images depicting a current layout of items on a set of shelves in a retail scene. The sequence of individual and overlapping images are processed by the image processing module 203 to cover a larger scene completely. The position of the client device 115 with respect to the set of shelves may vary every time an individual image is captured by the client device 115. The image processing module 203 compares the features of a previously received image and a next preview image and determines whether an overlap exists between the images based on the feature comparison. The image processing module 203 determines whether the overlap satisfies an overlap threshold. For example, the overlap threshold can have a range between 30%-50%. The image processing module 203 sends instructions to the user interface module 209 to generate graphical data including a target outline at the center of the preview image displayed by the client device 115. As the overlap between the images approaches the overlap threshold, the user interface module 209 cooperates with the image processing module 203 and updates a position of a visually distinct indicator relative to the target outline. For example, when the position of the visually distinct indicator, such as a colored ball is within a boundary of the target outline, then the overlap threshold is satisfied.

In some embodiments, the image processing module 203 stitches the individual images into a single linear panoramic image (e.g., a composite image) and sends it to the object detection module 205. In other embodiments, the image processing module 203 sends the individual and overlapping images to the object detection module 205.

The object detection module 205 may include software and/or logic to provide the functionality for performing object detection on the image and detecting a set of objects or items. The object detection module 205 identifies instances of semantic objects of certain shapes in the image. The object detection module 205 detects the set of objects using machine learning. The object detection module 205 uses machine learning to train an object detector algorithm to recognize shapes of a plurality of known objects defined in terms of curves or boundaries between different image regions. For example, the object detector algorithms include single shot detector (SSD), you only look once (YOLO) detector, etc. trained to recognize shapes of objects, such as bottles, cans, boxes, jars, etc. The object detection module 205 applies a series of transformations to an image and determines a set of features for the image. The set of features may be specific structures in the image, such as points, edges, or objects. For example, the object detection module 205 may determine a location (X-Y coordinates), an orientation, and an image descriptor for each feature identified in the image.

In some embodiments, the object detection module 205 uses corner detection algorithms for determining feature location. For example, the corner detection algorithms may include but not limited to Shi-Tomasi corner detection algorithm, Harris and Stephens corner detection algorithm, Features from Accelerated Segment Test (FAST) method, etc. In some embodiments, the object detection module 205 uses feature description algorithms for determining efficient image feature descriptors. For example, the feature description algorithms may include Binary Robust Independent Elementary Features (BRIEF), Scale-Invariant Feature Transform (SIFT), etc. An image descriptor of a feature may be a 256-bit bitmask which describes the image sub-region covered by the feature. The object detection module 205 may compare each pair of 256 pixel pairs near the feature for intensity and based on each comparison, the object detection module 205 may set or clear one bit in the 256-bit bitmask.

In some embodiments, the object detection module 205 matches the features of the image with the features of shapes of known objects that the object detection module 205 has trained an object detector algorithm to recognize. The object detection module 205 detects a set of items in the image and assigns a region of interest around each of the detected items identifying their locations.

As shown in the examples of FIGS. 3A-3G, the graphical representations illustrate one embodiment of a process for performing object detection and labeling of items in an image.

Figure 3A:
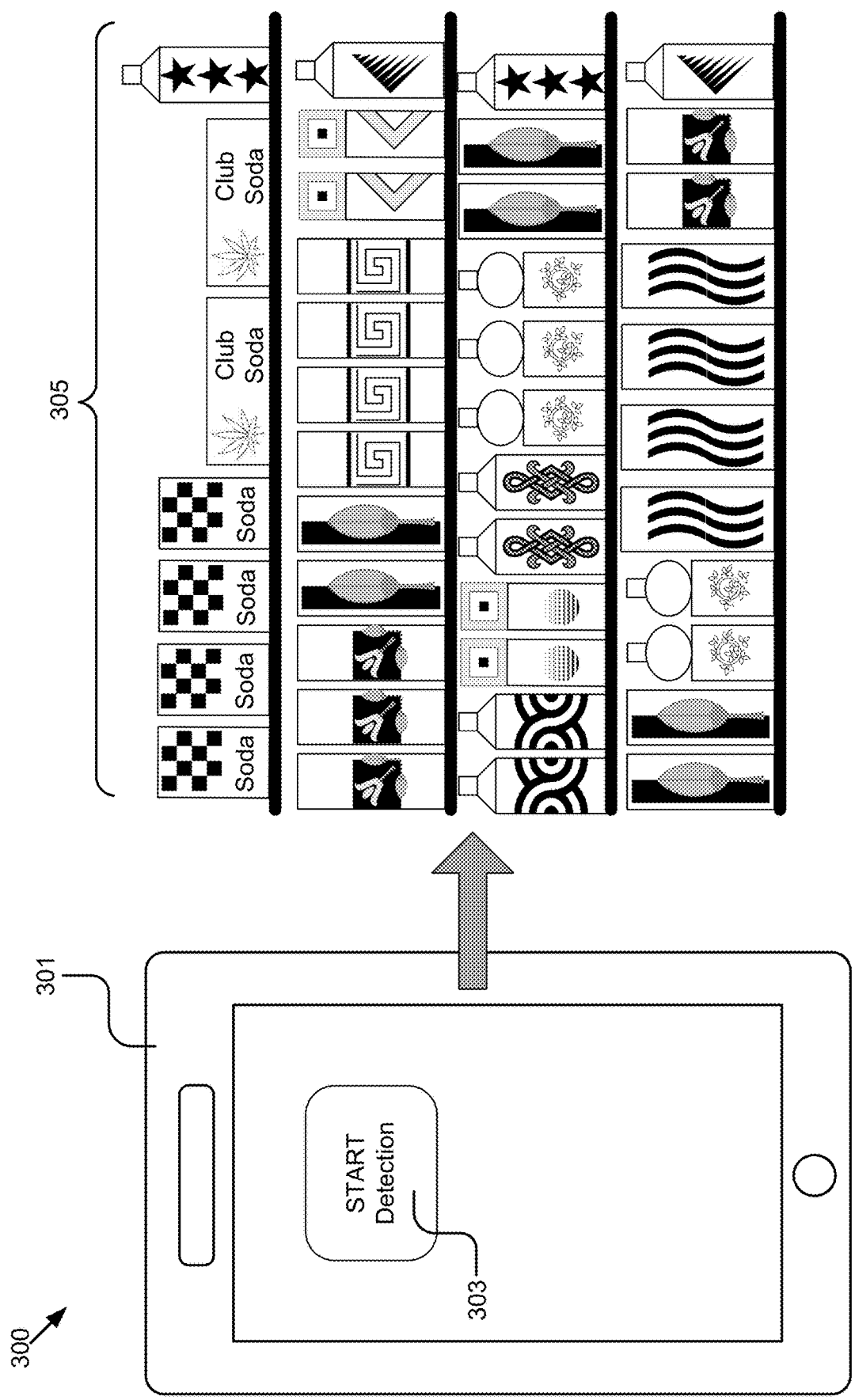
Figure 3B:
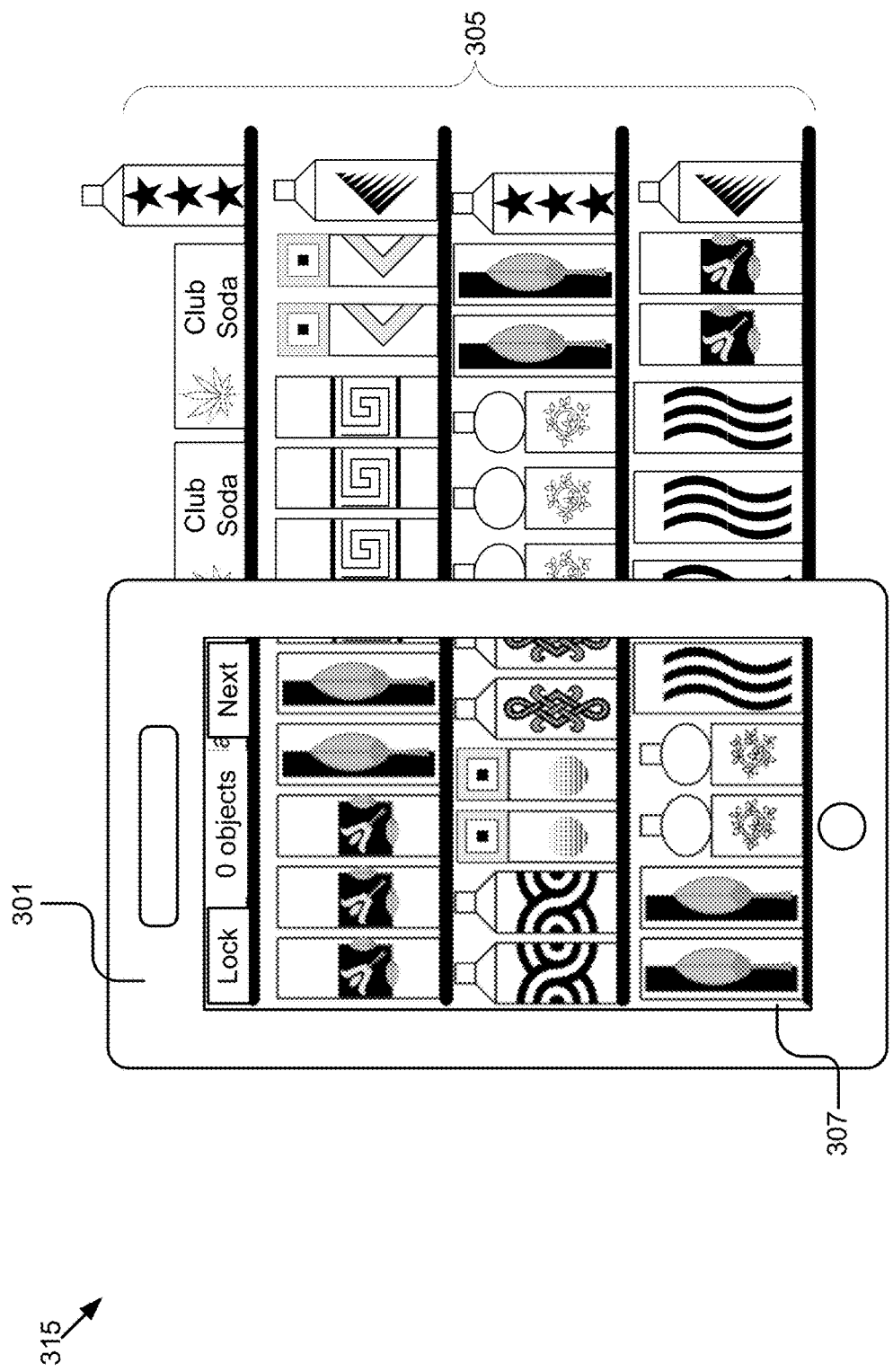

In FIG. 3A, the graphical representation 300 includes a mobile device 301 and a set 305 of shelves. When the user selects the "START Detection" button 303, the object detection module 205 initiates the object detection process. In FIG. 3B, the graphical representation 315 illustrates pointing the mobile device 301 at a portion of the set 305 of shelves to detect the items appearing in the preview image 307 displayed by the mobile device 301. The object detection module 205 identifies a region of interest (ROI) bordering each of the detected items in the image. A region of interest can be of any shape, for example, a polygon, a circle with a center point and a diameter, a rectangle having a width, a height and one or more reference points for the region (e.g., a center point, one or more corner points for the region), etc. The object detection module 205 determines the set of coordinates cx (x coordinate of center), cy (y coordinate of center), h (height of detected item), and w (width of detected item) associated with the region of interest. In one example, the region of interest may border the matched item in its entirety. In another example, the region of interest may border the exposed label containing pictorial and textual information associated with the detected item.

Figure 3C:
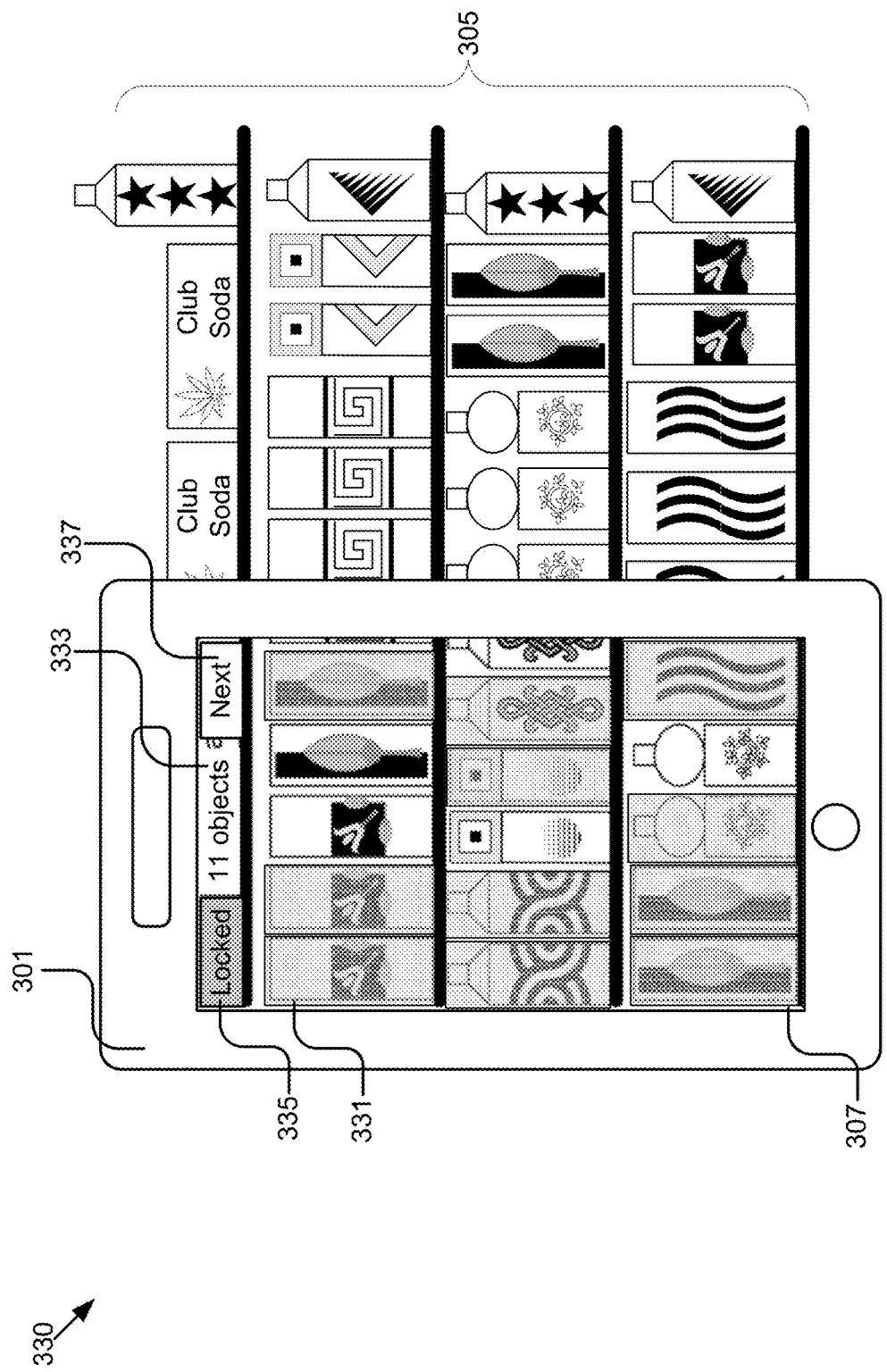

As shown in the example of FIG. 3C, the graphical representation 330 illustrates the detection of a set 333 of items on the preview image 307 displayed by the mobile device 301. The object detection module 205 sends instructions to the user interface module 209 to add a region of interest 331 to the preview image for each detected item. The region of interest 331 highlights a location of the detected item in the preview image 307. For example, the region of interest 331 can be highlighted in color, for example, yellow. It can be transparent to show the detected item.

The object detection reaches saturation in terms of the number of items that can be detected in the image. For example, the detection of items in the image depends on one or more factors, such as the orientation of the client device 115, the movement of the client device 115, the distance of the client device 115 from the scene, and the preview duration. The associated effects of those factors on the preview image can result in some set of items remaining undetected in the preview image. More items in the image can be detected by the object detection module 205 based on the user adjusting the one or more above indicated factors. For example, the user can extend the duration of preview to let the object detection module 205 to detect more items. When the saturation of object detection is reached, the object detection module 205 sends instructions to the image processing module 203 to retain the items identified thus far and receive a still image of the scene with the retained items. In some embodiments, as shown in FIG. 3C, when the user selects the "Lock" button 335, the object detection module 205 suspends the object detection on the preview image and receives a still image of the identified items (with the identified items retained in the still image). When the user is ready to start labeling the items, the "Next" button 337 can be selected by the user.

Figure 3D:
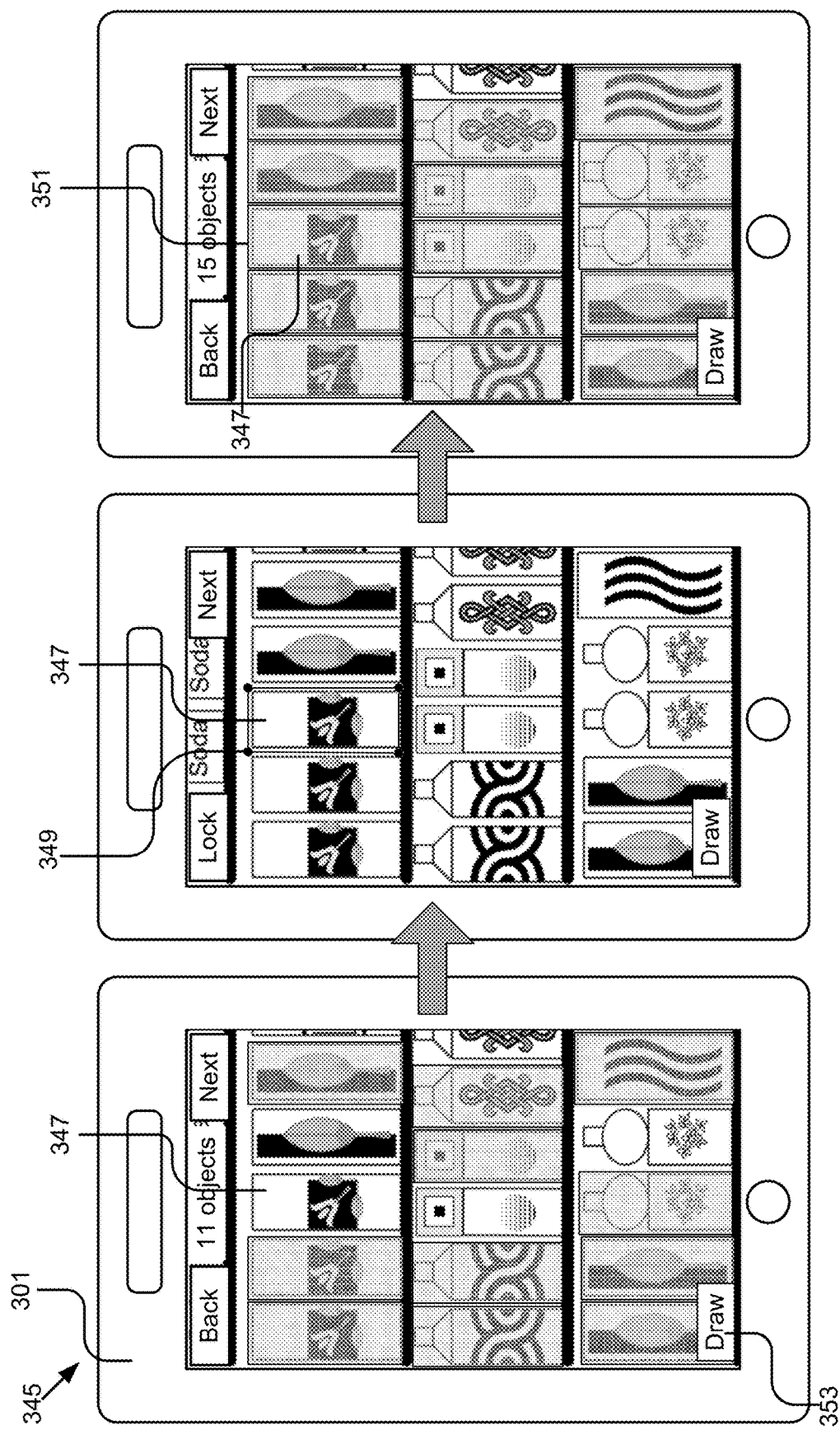

In some embodiments, the object detection module 205 sends instructions to the user interface module 209 to generate a user interface for the user to mark and label images. For example, the user interface enables the user to add to and/or edit the set of detected items in the image. The object detection module 205 receives user input on the user interface for creating a region of interest around an undetected item or edit a region of interest that appears skewed around a detected item. As shown in the example of FIG. 3D, the graphical representation 345 illustrates receiving user selection of a set 349 of anchor points on an originally undetected item 347 in the image displayed by the mobile device 301. The user starts by selecting the "Draw" button 353 for drawing the region of interest around the item 347. Every time the user selects a spot around the item 347 to place the anchor point, it gets connected by a line to a previously placed anchor point such that all anchor points are connected to each other. The set 349 of connected anchor points form a region of interest (e.g., a rectangle) around the item 347. The object detection module 205 sends instructions to the user interface module 209 to highlight the region of interest 351 around the item 347 and adds the item 347 to the set of detected items. In some embodiments, the object detection module 205 uses the user-generated region of interest 351 to train the object detector algorithm to recognize the shape. The user can repeat the same steps to create regions of interest around other similarly undetected items in the image.

In some embodiments, the object detection module 205 sends data including the detected items and their corresponding regions of interest to the labeling module 207 and the user interface module 209. In other embodiments, the object detection module 205 stores the data including the detected items and their corresponding regions of interest in the data storage 243.

Figure 3E:
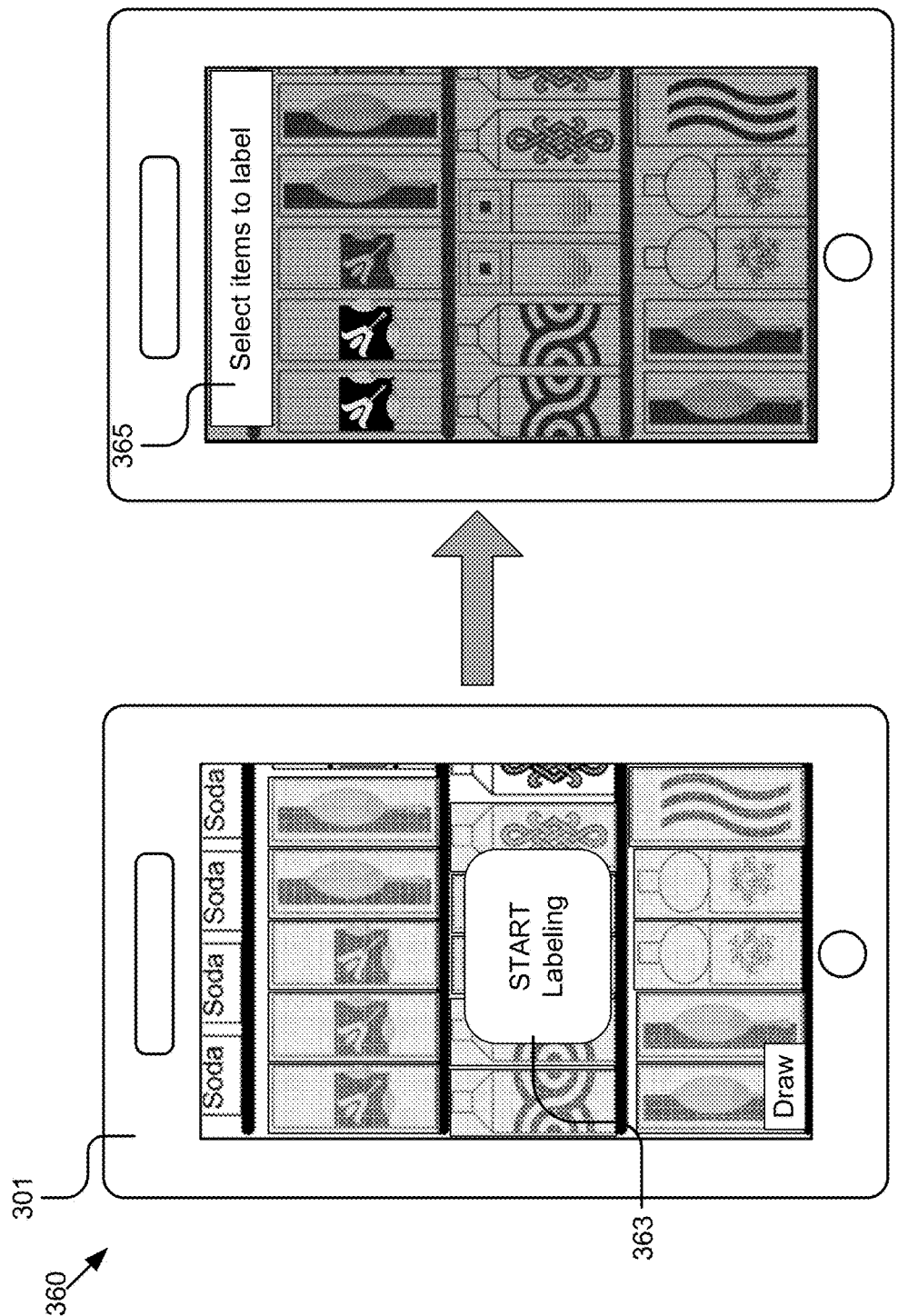

The labeling module 207 may include soft are and/or logic to provide the functionality for cropping and labeling an image of a detected item. The labeling module 207 receives user selection of one or more detected items in an image for purposes of labeling. As shown in the example of FIG. 3E, the graphical representation 360 illustrates a set of detected items with corresponding regions of interest on a display of the mobile device 301. When the user selects the "START Labeling" button 363, the labeling module 207 initiates the labeling process. The user interface of the mobile device 301 is updated to display a notification 365 for receiving the selection of items.

The labeling module 207 cooperates with the capture device 247 to receive a scan of a barcode or other identifier associated with the selected item at the scene. In some embodiments, the labeling module 207 decodes the barcode scan and converts it into text. The labeling module 207 accesses a database of product information in the data storage 243, compares the converted text against the database, and determines symbolic information associated with the selected item for labeling. For example, the symbolic information may include a Universal Product Code (UPC), Stock Keeping Unit (SKU) identifier, physical dimensions (e.g., width, height, etc.), price, product name, brand name, size, color, packaging version, and other metadata (e.g., product description). In the instance where the database search does not yield a match for the scanned barcode, the user can manually label the selected item.

As shown in the example of FIG. 3F, the graphical representation 375 illustrates the next set of sequences in the labeling phase from FIG. 3E. In FIG. 3F, the user selects regions of interest associated with a common product or object in the image. The user interface on the mobile device 301 highlights, or otherwise indicates selection of, the user selected items. The user interface is updated to display a notification 377 requesting the user to scan a barcode of the highlighted items. The user can pick one of the items 379 from the shelf to scan the barcode 381 using the mobile device 301. The labeling module 207 determines an object identifier associated with the selected items based on the barcode scan and uses the object identifier to label the selected items. For example, the object identifier may include UPC or SKU. The labeling module 207 crops an image of the selected item using the region of interest corresponding to the selected item. The labeling module 207 labels the cropped image using the object identifier and stores the labeled image in a product database in the data storage 243 and/or training an image recognition algorithm.

Figure 3G:
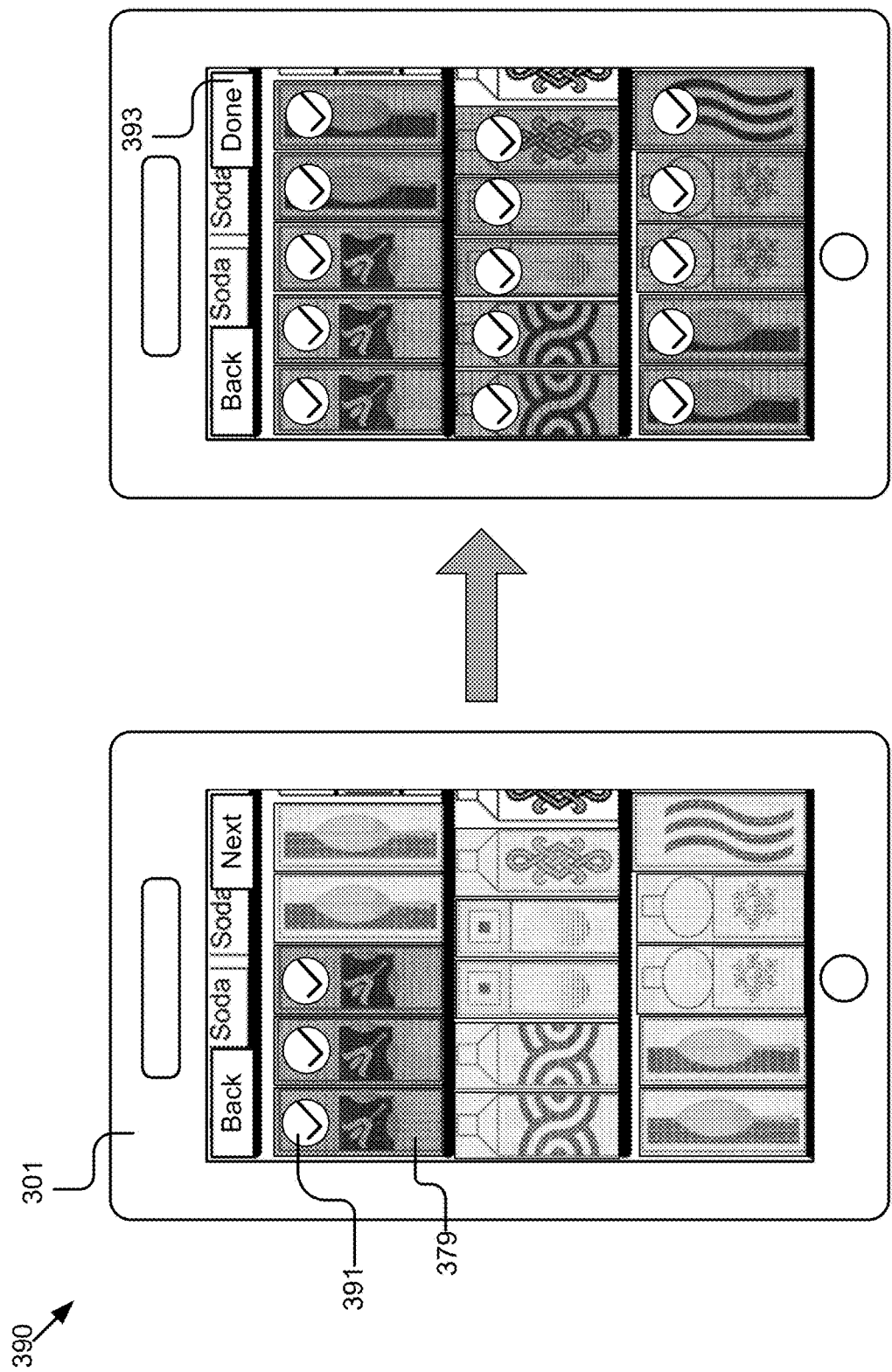

As shown in the example graphical representation 390 of FIG. 3G, after the user has scanned the barcode of one of the selected items 379 in FIG. 3F, the labeling module 207 instructs the user interface module 209 to update the user interface of the mobile device 301. The user interface shows an icon 391 placed on each selected item 379 to indicate that the image of the item is cropped and labeled successfully. The user can repeat the same steps to crop and label the images of other items in the image. When all the items in the image are cropped and labeled, the user can select the "Done" button 393 to complete the labeling process.

In the instances where overlapping images of a scene are processed by the image processing module 203, the object detection module 205 performs object detection on a same set of items present in two or more overlapping images. As a result, the labeling module 207 crops and labels the images of the items already labeled from the previous overlapping image. In some embodiments, the labeled images of such items correspond to different perspectives because the position of the client device 115 with respect to the scene varies for every overlapping image. The labeling module 207 stores the labeled images of an item belonging to different perspectives in the data storage 243. In the instances where the object detection module 205 detects a same item in multiple facing sides and packaging versions in one or more images of a scene, the labeling module 207 stores the labeled images of the item belonging to multiple facing sides and packaging versions. For example, a first item detected with a front facing and a second item detected with a side facing, where the first and the second item are of the same UPC, the labeling module 207 stores one labeled image for the front facing item and another labeled image for the side facing item. Similarly, in another example, a first item detected in a first packaging version and a second item detected in a second packaging version, where the first packaging version and the second packaging version are of the same UPC, the labeling module 207 stores one labeled image for the first packaging version and another labeled image for the second packaging version.

The user interface module 209 may include software and/or logic for providing user interfaces to a user. In some embodiments, the user interface module 209 receives instructions from the image processing module 203 to generate a user interface of the live preview image on the display of the client device 115. The user interface module 209 receives instructions from the object detection module 205 to generate a graphical user interface for displaying regions of interests. For example, the image may be displayed on the user interface with each of the detected items on the shelves highlighted with a colored region of interest indicator around them. It should be understood that the indication of a region of interest can be possible with any kind of visual indicator. In some embodiments, the user interface module 209 receives instructions from the labeling module 207 to generate a graphical user interface for denoting labeled items. The user interface module 209 sends graphical user interface data to the client device 115 via the communication unit 241 causing the client device 115 to display the data as a graphical user interface.

Figure 4:
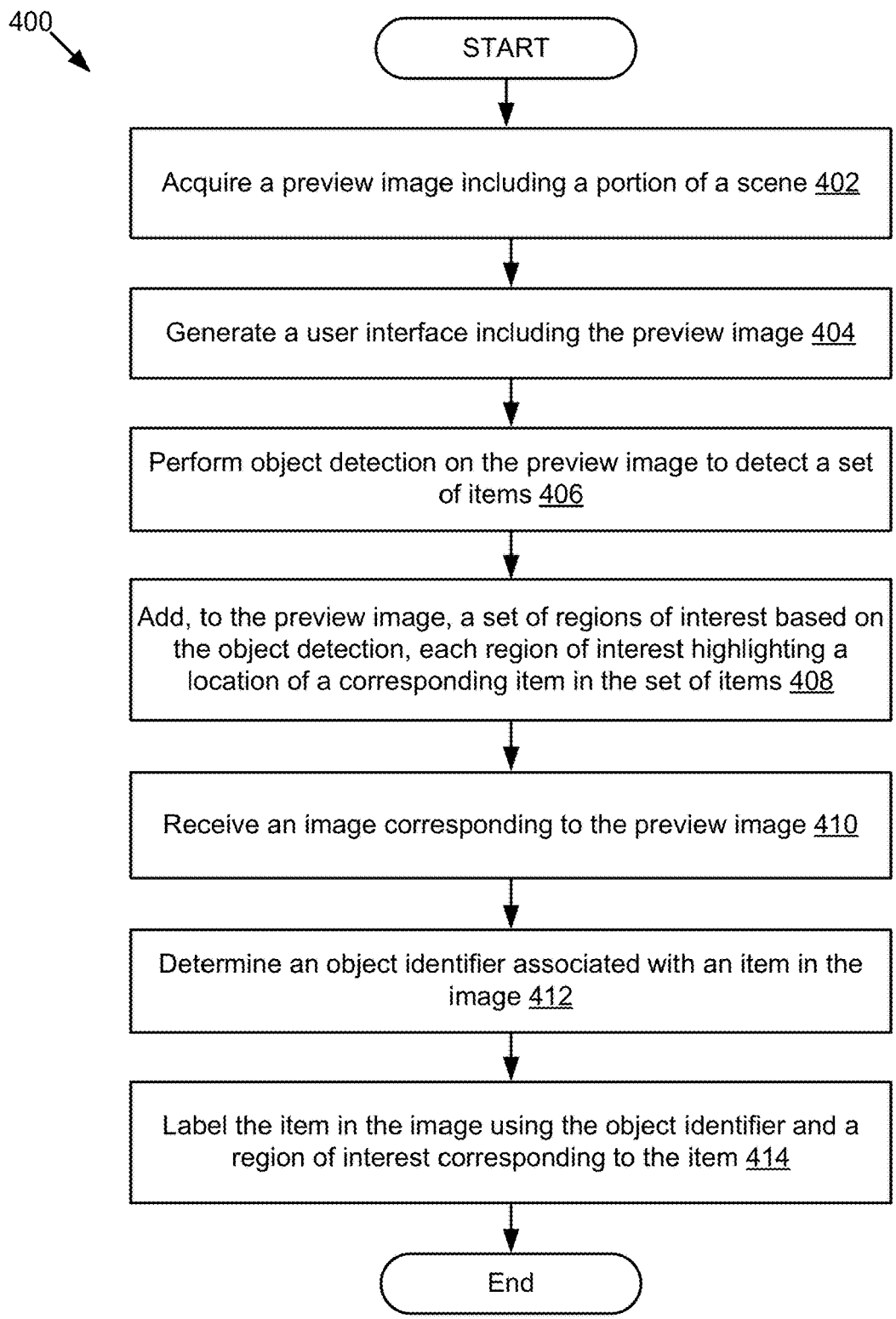
FIG. 4 is a flow diagram illustrating one embodiment of an example method for gathering and labeling images for use by a machine learning algorithm for image classification.

FIG. 4 is a flow diagram illustrating one embodiment of an example method 400 for performing object detection and labeling of detected items in an image. At 402, the image processing module 203 acquires a preview image of a portion of a scene (e.g., from a client device 115). At 404, the user interface module 209 generates a user interface including the preview image. At 406, the object detection module 205 performs object detection on the preview image to detect a set of items. At 408, the object detection module 205 adds, to the preview image, a set of regions of interest based on the object detection, each region of interest highlighting a location of a corresponding item in the set of items. At 410, the object detection module 205 receives an image corresponding to the preview image. At 412, the labeling module 207 determines an object identifier associated with an item in the image. At 414, the labeling module 207 labels the item in the image using the object identifier and a region of interest corresponding to the item.

Figure 5A:
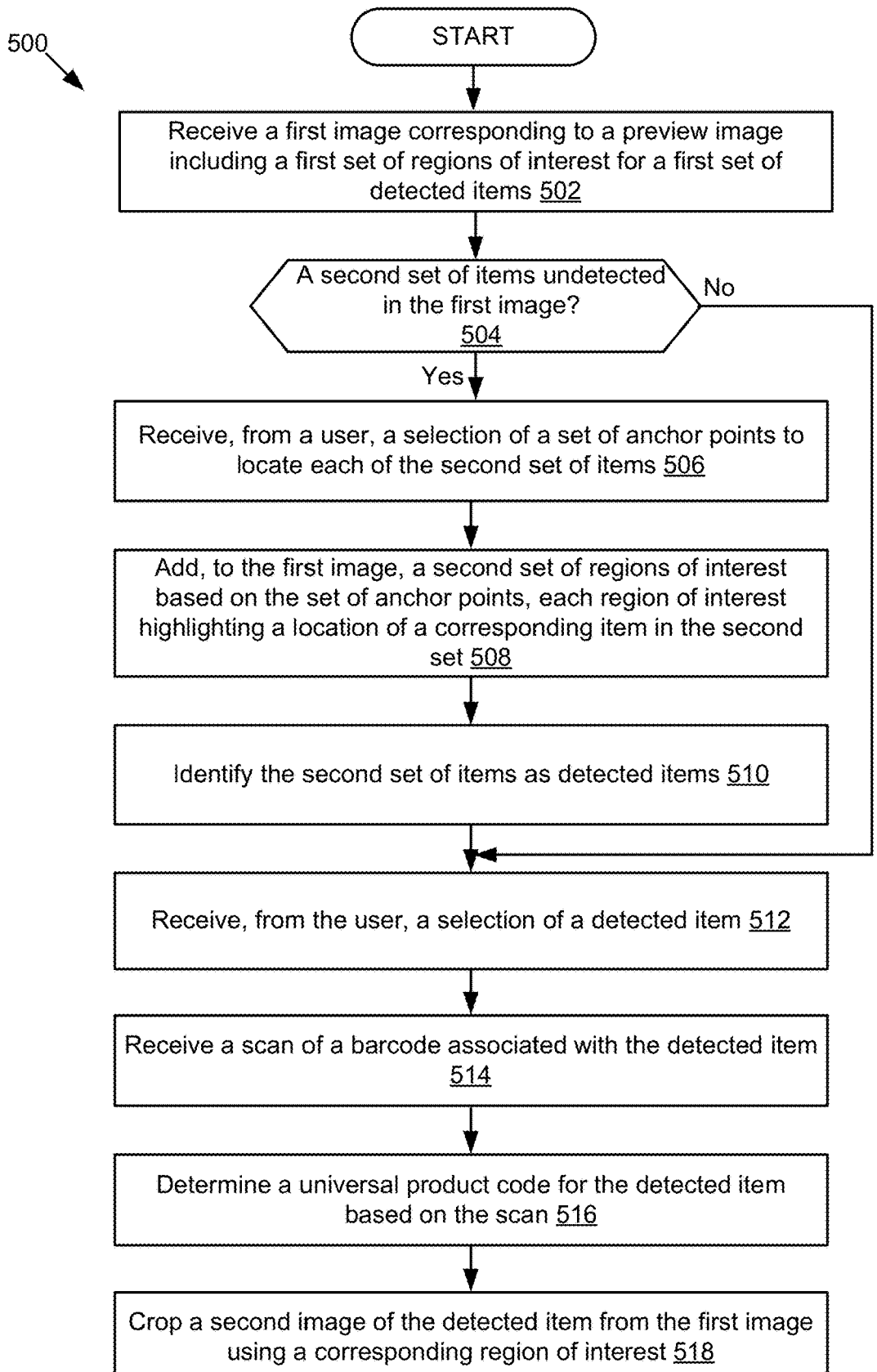
FIG. 5A-5B are flow diagrams illustrating one embodiment of another example method for gathering and labeling images for use by a machine learning algorithm for image classification.
Figure 5B:
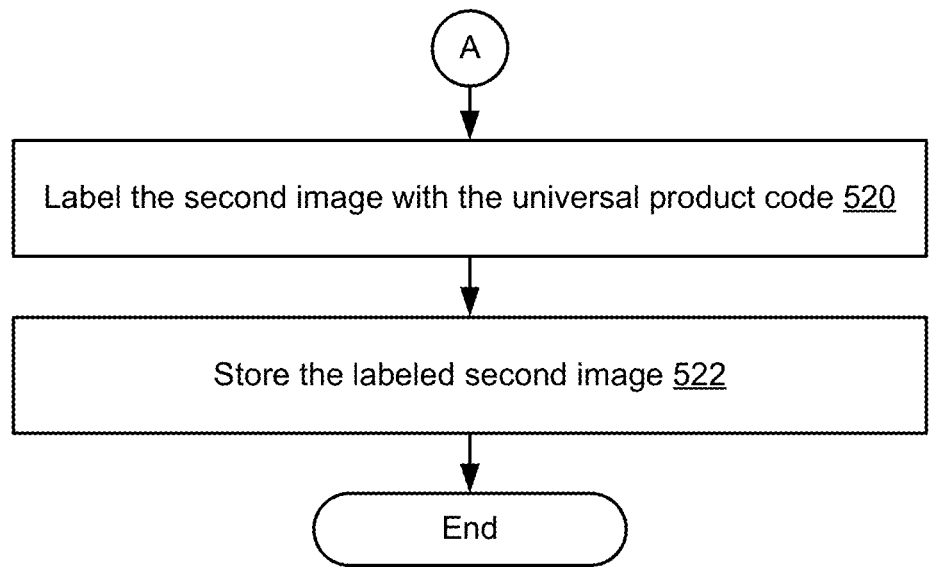

FIGS. 5A and 5B are flow diagrams illustrating one embodiment of another example method 500 for performing object detection and labeling of detected items in an image. At 502, the object detection module 205 receives a first image corresponding to a preview image including a first set of regions of interest for a first set of detected items. At 504, the object detection module 205 determines whether a second set of items are undetected in the first image. If the second set of items are not undetected in the first image, the method 500 forwards the process to 512.

If the second set of items are undetected in the first image, at 506, the object detection module 205 receives, from a user, a selection of a set of anchor points to locate each of the second set of items. At 508, the object detection module 205 adds, to the first image, a second set of regions of interest based on the set of anchor points, each region of interest highlighting a location of a corresponding item in the second set. At 510, the object detection module 205 identifies the second set of items as detected items. At 512, the labeling module 207 receives a selection of a detected item from a user. At 514, the labeling module 207 receives a scan of a barcode associated with the detected item. At 516, the labeling module 207 determines a universal product code for the detected item based on the scan. At 518, the labeling module 207 crops a second image of the detected item from the first image using a corresponding region of interest. At 520, the labeling module 207 labels the second image with the universal product code. At 522, the labeling module 207 stores the labeled second image.

A system and method for gathering and labeling images for use by a machine learning algorithm for image classification has been described. In the above description, for purposes of explanation, numerous specific details are set forth in order to provide a thorough understanding of the techniques introduced above. It will be apparent, however, to one skilled in the art that the techniques can be practiced without these specific details. In other instances, structures and devices are shown in block diagram form in order to avoid obscuring the description and for ease of understanding. For example, the techniques are described in one embodiment above primarily with reference to software and particular hardware. However, the present invention applies to any type of computing system that can receive data and commands, and present information as part of any peripheral devices providing services.

Reference in the specification to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Some portions of the detailed descriptions described above are presented in terms of algorithms and symbolic representations of operations on data bits within a computer memory. These algorithmic descriptions and representations are, in some circumstances, used by those skilled in the data processing arts to convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing", "computing", "calculating", "determining", "displaying", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The techniques also relate to an apparatus for performing the operations herein. This apparatus may be specially constructed for the required purposes, or it may comprise a general-purpose computer selectively activated or reconfigured by a computer program stored in the computer. Such a computer program may be stored in a non-transitory computer readable storage medium, such as, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

Some embodiments can take the form of an entirely hardware embodiment, an entirely software embodiment or an embodiment containing both hardware and software elements. One embodiment is implemented in software, which includes but is not limited to firmware, resident software, microcode, etc.

Furthermore, some embodiments can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

A data processing system suitable for storing and/or executing program code can include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description above. In addition, the techniques are not described with reference to any particular programming language. It will be appreciated that a variety of programming languages may be used to implement the teachings of the various embodiments as described herein.

The foregoing description of the embodiments has been presented for the purposes of illustration and description. It is not intended to be exhaustive or to limit the specification to the precise form disclosed. Many modifications and variations are possible in light of the above teaching. It is intended that the scope of the embodiments be limited not by this detailed description, but rather by the claims of this application. As will be understood by those familiar with the art, the examples may be embodied in other specific forms without departing from the spirit or essential characteristics thereof. Likewise, the particular naming and division of the modules, routines, features, attributes, methodologies and other aspects are not mandatory or significant, and the mechanisms that implement the description or its features may have different names, divisions and/or formats. Furthermore, as will be apparent to one of ordinary skill in the relevant art, the modules, routines, features, attributes, methodologies and other aspects of the specification can be implemented as software, hardware, firmware or any combination of the three. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the specification is in no way limited to embodiment in any specific programming language, or for any specific operating system or environment. Accordingly, the disclosure is intended to be illustrative, but not limiting, of the scope of the specification, which is set forth in the following claims.

What is claimed is:

1. A method comprising:
    acquiring a first preview image including a first portion of a scene;
    generating a user interface including the first preview image;
    performing object detection on the first preview image to detect a first set of items;
    adding, to the first preview image, a first set of regions of interest based on the object detection, each region of interest in the first set highlighting a location of a corresponding item in the first set of items;
    receiving a first image corresponding to the first preview image;
    determining an object identifier uniquely assigned to a first item in the first image;
    cropping a second image of the first item from the first image using a region of interest corresponding to the first item; and
    labeling the second image of the first item with the uniquely assigned object identifier and storing the labeled second image.

2. The method of claim 1, further comprising:
    responsive to a second set of items remaining undetected in the first image, receiving, from a user, a selection of a set of anchor points to locate one or more items of the second set of items;
    adding, to the first image, a second set of regions of interest based on the set of anchor points, each region of interest in the second set highlighting a location of an associated item in the second set of items; and
    identifying the first set of items and the second set of items as a set of detected items, wherein the first item belongs to the set of detected items.

3. The method of claim 2, further comprising:
    acquiring a second preview image of a second portion of the scene, the second preview image having an overlap with the first image that satisfies an overlap threshold;
    performing object detection on the second preview image to detect a third set of items, the third set of items including the first item due to the overlap;
    adding, to the second preview image, a third set of regions of interest based on the object detection, each region of interest in the third set highlighting a location of an associated item in the third set of items;
    receiving a third image corresponding to the second preview image; and
    labeling the first item in the third image.

4. The method of claim 3, wherein labeling the first item in the third image comprises:
    cropping a fourth image of the first item from the third image using the region of interest corresponding to the first item;
    labeling the fourth image of the first item with a universal product code; and
    storing the labeled fourth image.

5. The method of claim 3, wherein the first item is captured from a first perspective in the first image and from a second perspective in the third image.

6. The method of claim 1, wherein determining the object identifier uniquely assigned to the first item comprises:
    receiving, from a user, a selection of the first item;
    receiving a scan of a barcode associated with the first item; and
    determining a universal product code uniquely assigned to the first item based on the scan of the barcode.

7. The method of claim 6, wherein determining the universal product code uniquely assigned to the first item based on the scan of the barcode comprises:
- decoding and converting the scan of the barcode into text;
- comparing the text against a database of product information; and
- determining the universal product code uniquely assigned to the first item based on comparing the text against the database of product information.

8. A system comprising:
one or more processors; and
a memory, the memory storing instructions, which when executed cause the one or more processors to:
- acquire a first preview image including a first portion of a scene;
- generate a user interface including the first preview image;
- perform object detection on the first preview image to detect a first set of items;
- add, to the first preview image, a first set of regions of interest based on the object detection, each region of interest in the first set highlighting a location of a corresponding item in the first set of items;
- receive a first image corresponding to the first preview image;
- determine an object identifier uniquely assigned to a first item in the first image;
- crop a second image of the first item from the first image using a region of interest corresponding to the first item; and
- label the second image of the first item with the uniquely assigned object identifier and storing the labeled second image.

9. The system of claim 8, wherein the instructions further cause the one or more processors to:
- responsive to a second set of items remaining undetected in the first image, receive, from a user, a selection of a set of anchor points to locate one or more of the second set of items;
- add, to the first image, a second set of regions of interest based on the set of anchor points, each region of interest in the second set highlighting a location of an associated item in the second set of items; and
- identify the first set of items and the second set of items as a set of detected items, wherein the first item belongs to the set of detected items.

10. The system of claim 9, wherein the instructions further cause the one or more processors to:
- acquire a second preview image of a second portion of the scene, the second preview image having an overlap with the first image that satisfies an overlap threshold;
- perform object detection on the second preview image to detect a third set of items, the third set of items including the first item due to the overlap;
- add, to the second preview image, a third set of regions of interest based on the object detection, each region of interest in the third set highlighting a location of an associated item in the third set of items;
- receive a third image corresponding to the second preview image; and
- label the first item in the third image.

11. The system of claim 10, wherein to label the first item in the third image, the instructions further cause the one or more processors to:
- crop a fourth image of the first item from the third image using the region of interest corresponding to the first item;
- label the fourth image of the first item with a universal product code; and
- store the labeled fourth image.

12. The system of claim 10, wherein the first item is captured from a first perspective in the first image and from a second perspective in the third image.

13. The system of claim 8, wherein to determine the object identifier uniquely assigned to the first item, the instructions further cause the one or more processors to:
- receive, from a user, a selection of the first item;
- receive a scan of a barcode associated with the first item; and
- determine a universal product code uniquely assigned to the first item based on the scan of the barcode.

14. The system of claim 13, wherein to determine the universal product code uniquely assigned to the first item based on the scan of the barcode, the instructions further cause the one or more processors to:
- decode and convert the scan of the barcode into text;
- compare the text against a database of product information; and
- determine the universal product code uniquely assigned to the first item based on comparing the text against the database of product information.

15. A computer program product comprising a non-transitory computer readable medium storing a computer readable program, wherein the computer readable program when executed on a computer causes the computer to:
- acquire a first preview image including a first portion of a scene;
- generate a user interface including the first preview image;
- perform object detection on the first preview image to detect a first set of items;
- add, to the first preview image, a first set of regions of interest based on the object detection, each region of interest in the first set highlighting a location of a corresponding item in the first set of items;
- receive a first image corresponding to the first preview image;
- determine an object identifier uniquely assigned to a first item in the first image;
- crop a second image of the first item from the first image using a region of interest corresponding to the first item; and
- label the second image of the first item with the uniquely assigned object identifier and storing the labeled second image.

16. The computer program product of claim 15, wherein the computer readable program when executed on the computer further causes the computer to:
- responsive to a second set of items remaining undetected in the first image, receive, from a user, a selection of a set of anchor points to locate one or more of the second set of items;
- add, to the first image, a second set of regions of interest based on the set of anchor points, each region of interest in the second set highlighting a location of an associated item in the second set of items; and
- identify the first set of items and the second set of items as a set of detected items, wherein the first item belongs to the set of detected items.

17. The computer program product of claim 16, wherein the computer readable program when executed on the computer further causes the computer to:

acquire a second preview image of a second portion of the scene, the second preview image having an overlap with the first image that satisfies an overlap threshold;

perform object detection on the second preview image to detect a third set of items, the third set of items including the first item due to the overlap;

add, to the second preview image, a third set of regions of interest based on the object detection, each region of interest in the third set highlighting a location of an associated item in the third set of items;

receive a third image corresponding to the second preview image; and label the first item in the third image.

18. The computer program product of claim 17, wherein to label the first item in the third image, the computer readable program when executed on the computer further causes the computer to:

crop a fourth image of the first item from the third image using the region of interest corresponding to the first item;

label the fourth image of the first item with a universal product code; and store the labeled fourth image.

19. The computer program product of claim 15, wherein to determine the object identifier uniquely assigned to the first item, the computer readable program when executed on the computer further causes the computer to:

receive, from a user, a selection of the first item;

receive a scan of a barcode associated with the first item; and determine a universal product code uniquely assigned to the first item based on the scan of the barcode.

20. The computer program product of claim 19, wherein to determine the universal product code uniquely assigned to the first item based on the scan of the barcode, the computer readable program when executed on the computer further causes the computer to:

decode and convert the scan of the barcode into text;

compare the text against a database of product information; and determine the universal product code uniquely assigned to the first item based on comparing the text against the database of product information.

\* \* \* \* \*